June 15, 1954
C. L. EVANS
2,680,953
ROTARY TYPE PUMP AND MOTOR HYDRAULIC TRANSMISSION
Filed Feb. 9, 1953
8 Sheets-Sheet 1
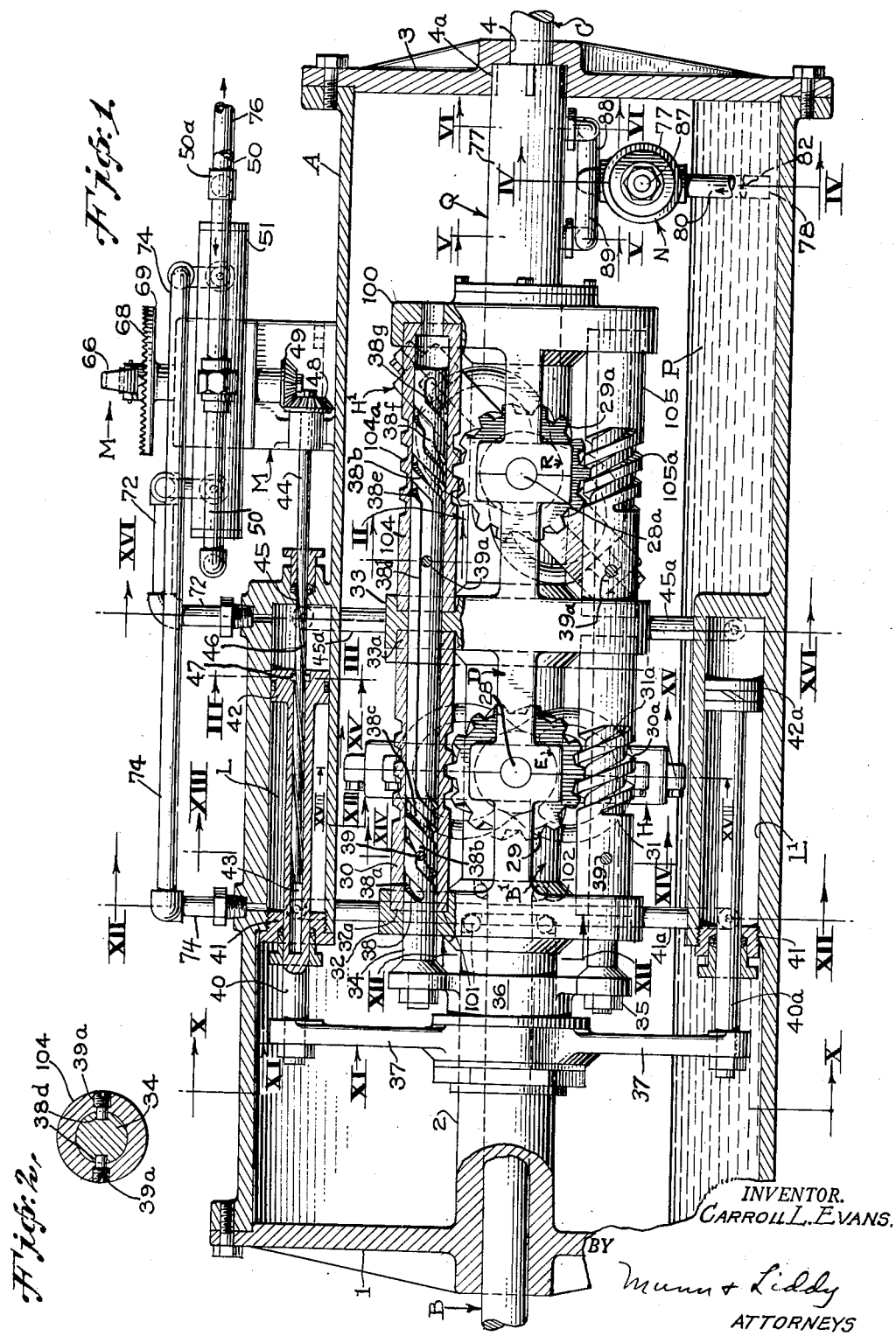
INVENTOR.
CARROLL L. EVANS.
BY
Munn + Liddy
ATTORNEYS

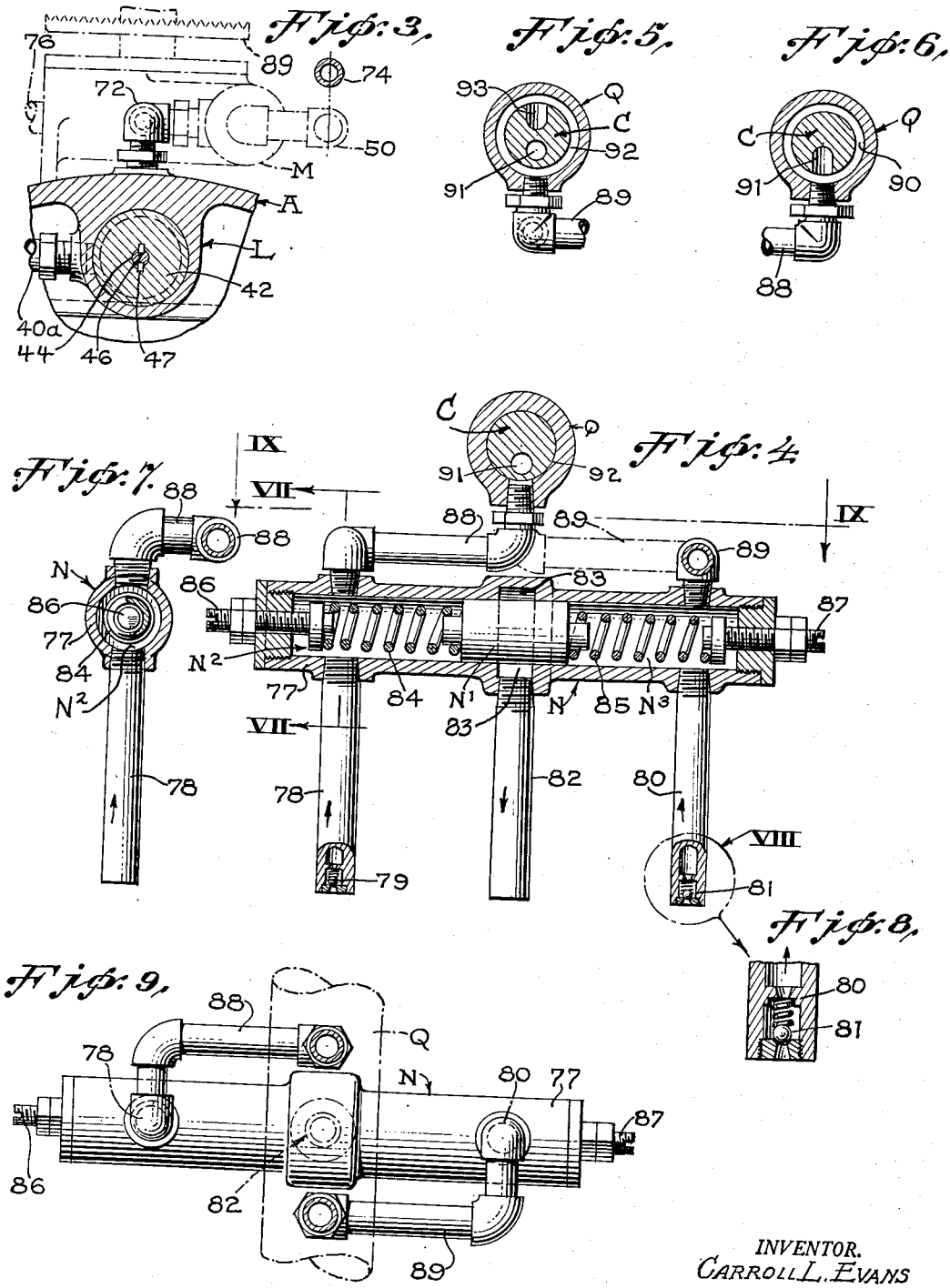

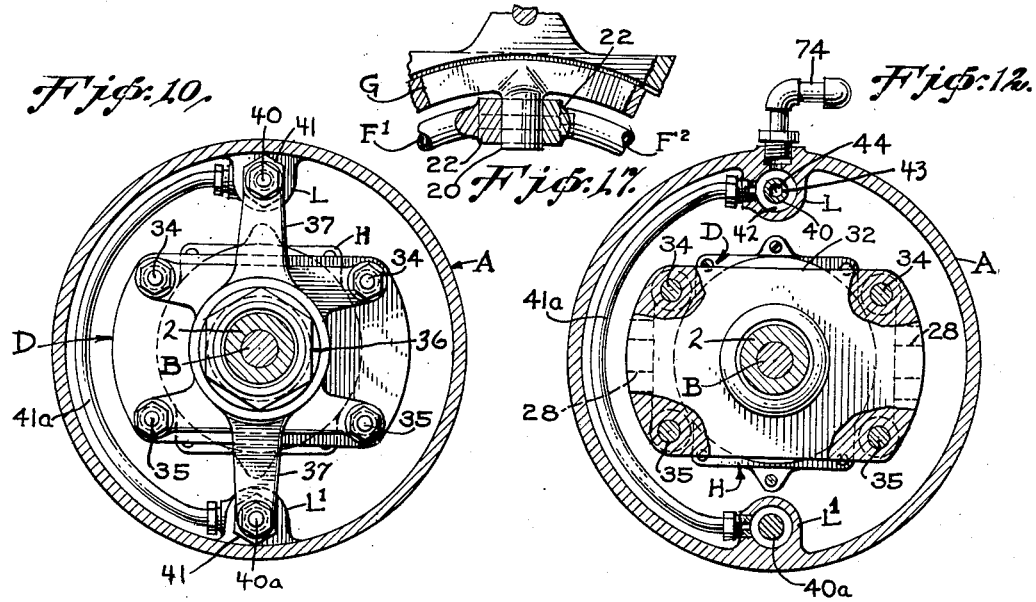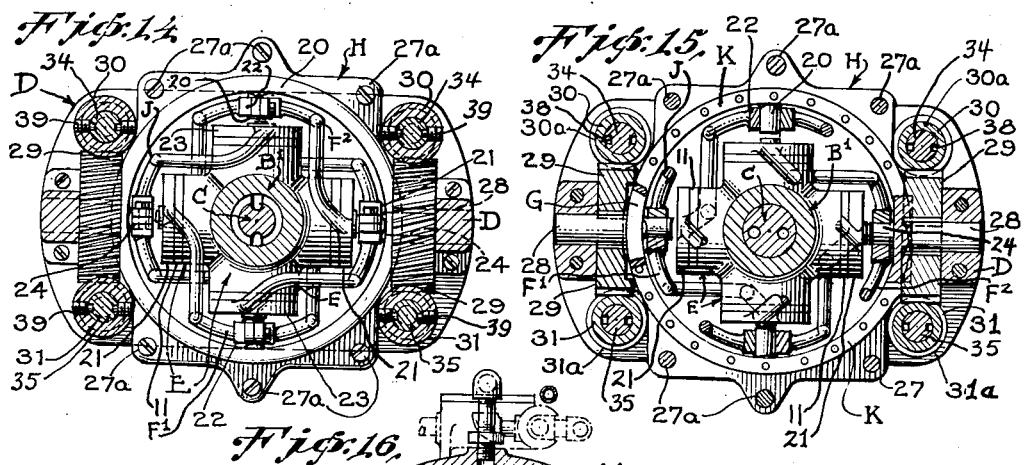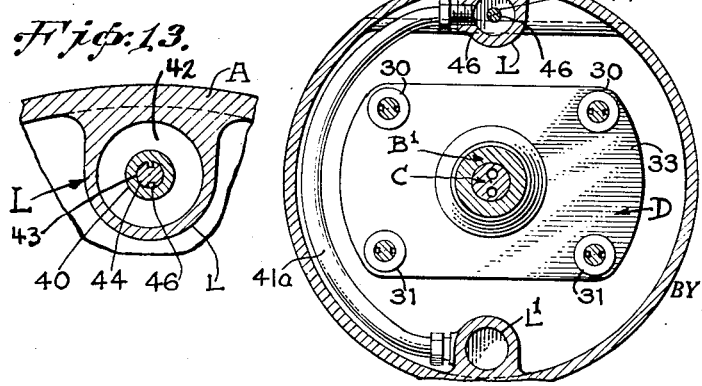

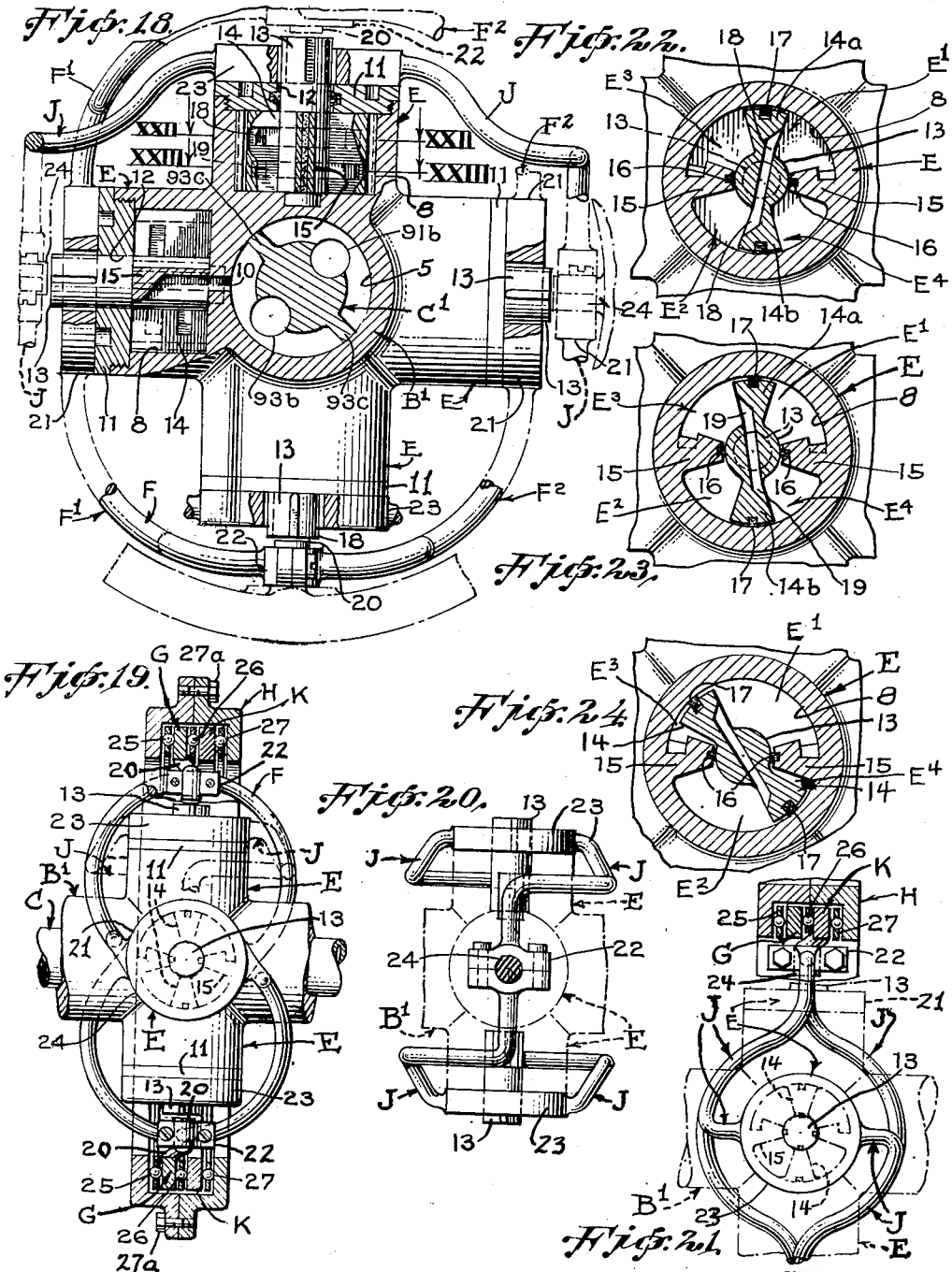

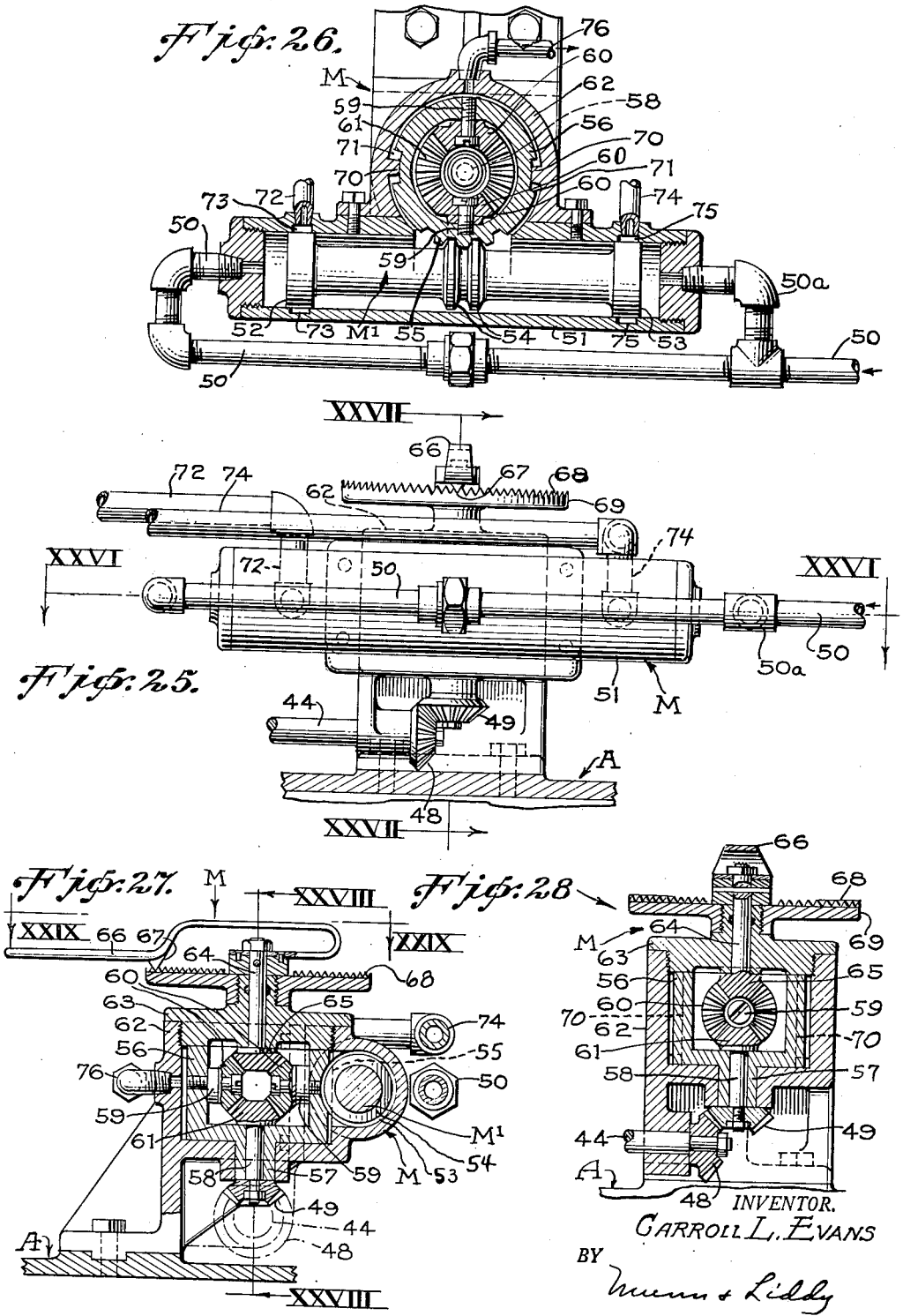

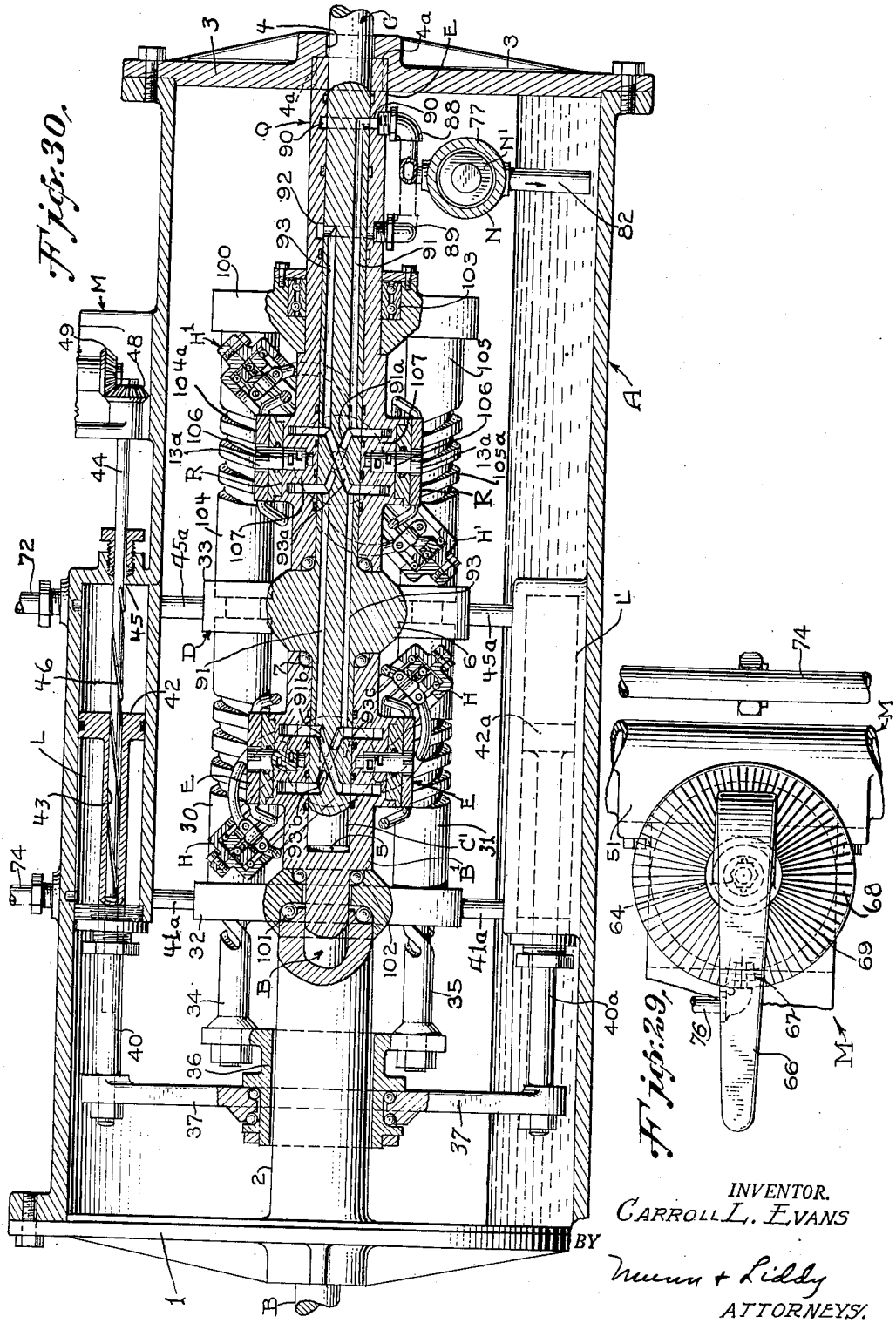

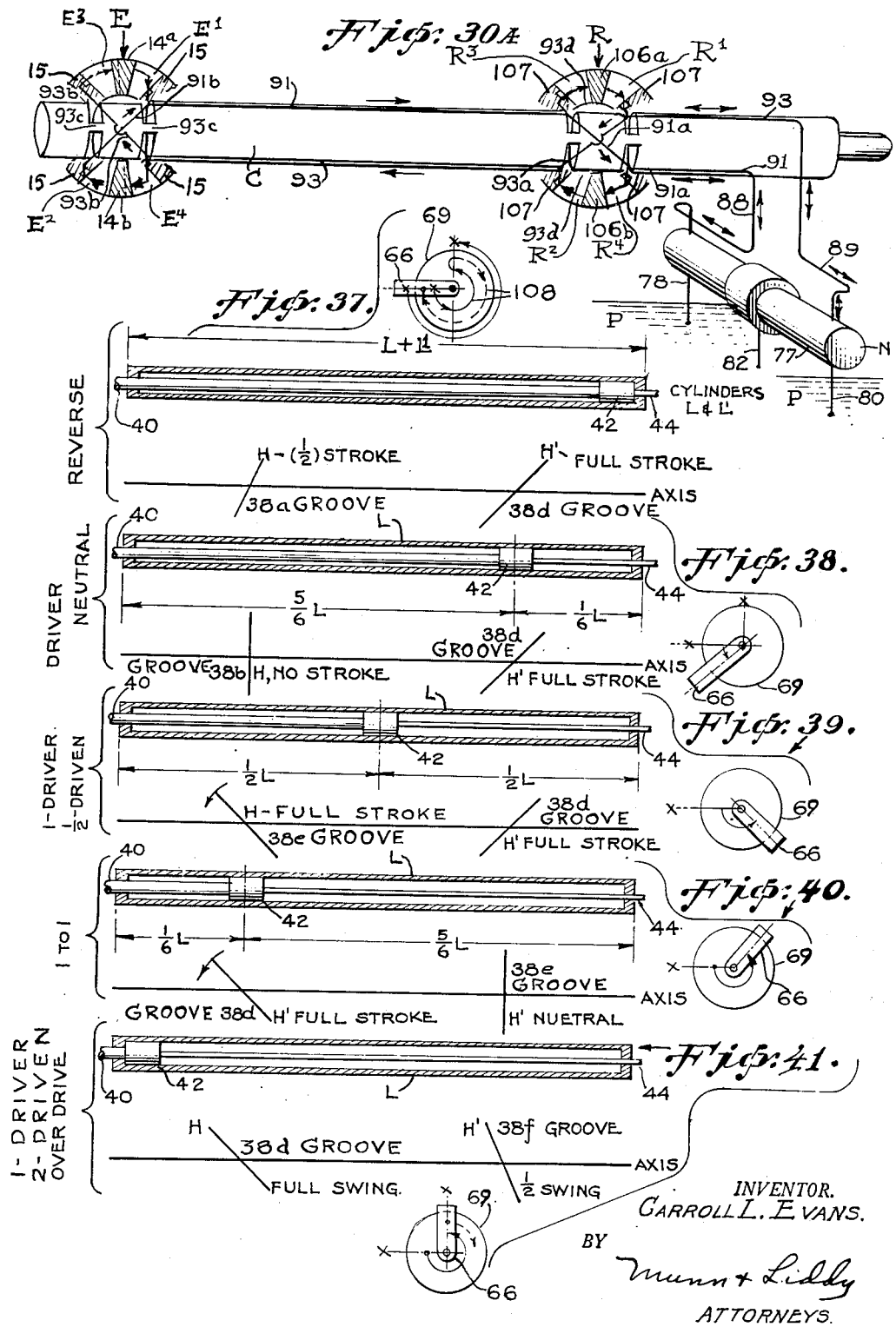

June 15, 1954

C. L. EVANS 2,680,953

ROTARY TYPE PUMP AND MOTOR HYDRAULIC TRANSMISSION

Filed Feb. 9, 1953

INVENTOR.
CARROLL L. EVANS
BY
Munn & Liddy
ATTORNEYS.

Patented June 15, 1954

2,680,953

UNITED STATES PATENT OFFICE 2,680,953

ROTARY TYPE PUMP AND MOTOR HYDRAULIC TRANSMISSION

Carroll L. Evans, Tipton, Calif.

Application February 9, 1953, Serial No. 335,901

4 Claims. (Cl. 60—53)

An object of my invention is to provide a hydraulic transmission in which any desired speed ratio may be maintained between the drive and driven shafts from a neutral position for the driven shaft up to an overdrive position with respect to the drive shaft. A novel manually controlled means is used that includes a lever that may be swung into any desired position between its limits of swing for predetermining the speed ratio between the drive and driven shafts.

It is also possible for the driven shaft to be rotated in a reverse direction to the drive shaft and to rotate at different speeds. The hydraulic transmission is compact in size and is durable and efficient for the purpose intended.

Other objects and advantages will appear in the following specification, and the novel features of the device will be particularly pointed out in the appended claims.

My invention is illustrated in the accompanying drawings forming a part of this application, in which:

Figure 1 is a longitudinal section through the device, portions being shown in elevation and the device is shown in neutral position;

Figure 2 is a transverse section taken along the line II—II of Figure 1, and illustrates one of the four cam shafts for rocking the gimbal rings of the two units of the fluid transmission in a predetermined manner;

Figures 3, 4, 5 and 6 are transverse sections taken along lines III—III, IV—IV, V—V and VI—VI of Figure 1;

Figure 7 is a section taken along the line VII—VII of Figure 4;

Figure 8 is an enlarged detail of a valve enclosed in the circled portion VIII in Figure 4;

Figure 9 is a section taken along the line IX—IX of Figure 4, and illustrates a top plan view of the fluid supply device;

Figure 31:
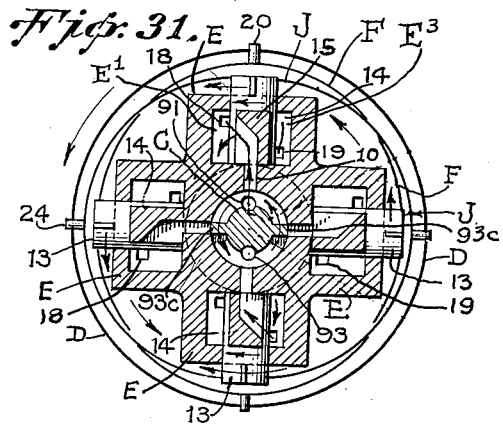

Figures 10 to 16, inclusive, are sections taken along the lines X—X to XVI—XVI, inclusive, of Figure 1.

Figure 17 illustrates the connection between a gimbal ring and a supporting ring;

Figure 18 illustrates a bank of cylinders used in the device; and is a section along the line XVIII—XVIII of Figure 1;

Figure 19 is a side elevation of Figure 18 on a smaller scale, and illustrates one of the gimbal rings operatively connected to two of the cylinders and to a supporting ring;

Figure 20 is also a side elevation of Figure 18, and illustrates the other gimbal ring operatively connected to the other two cylinders and to a second supporting ring;

Figure 21 is a top plan view of Figure 20 and illustrates the same gimbal supporting ring;

Figures 22 and 23 are sections taken along the lines XXII—XXII and XXIII—XXIII of Figure 18, and illustrates the fixed and swingable vanes in the cylinders;

Figure 24 is similar to Figures 22 and 23, but shows the movable vanes in a different position in the cylinder;

Figure 25 is a side elevation of the control unit shown in Figure 1;

Figures 26 and 27 are sections taken along the lines XXVI—XXVI and XXVII—XXVII on Figure 25;

Figure 28 is a section taken along the line XXVIII—XXVIII on Figure 27;

Figure 29 is a plan view taken along the line XXIX—XXIX of Figure 27;

Figure 30 is a view similar to Figure 1, but shows certain parts in section with the mechanism moved into a different position from that shown in Figure 1;

Figure 30A is a schematic showing of the fluid flow;

Figures 31 to 36, inclusive, are diagrammatic views illustrating the position of the parts for different degrees of rotation throughout one complete revolution; and Figures 37 to 41, inclusive, are diagrammatic views illustrating the position of certain parts when the device is set for Reverse, Neutral, Half Speed, One to One Ratio and Overdrive.

While I have shown only the preferred form of my invention, it should be understood that various changes or modifications may be made within the scope of the appended claims without departing from the spirit and scope of the invention.

In carrying out my invention, I provide a casing indicated generally at A in Figure 1. This casing is substantially cylindrical in shape and has its left hand end closed by a header 1. The header has an integral sleeve 2 and Figure 30 shows the sleeve 2 extending inwardly into the interior of the casing and rotatably receiving a drive shaft B. The other end of the casing is closed by a header 3 and this header has a central bore 4 in which a driven shaft C is rotatably received. The header 3 also has an enlarged recess 4a which is concentric with the bore 4 and which communicates therewith.

It will be seen from Figure 30 that the drive shaft B has an enlarged cylindrical portion B1, that is provided with a bore 5, this bore having its axis coinciding with the longitudinal axis of the drive shaft. Still referring to Figure 30, it will be seen that the forward end of the driven shaft C is rotatably received in the bore 5. The driven shaft has an enlargement that constitutes one part of a revolvable cage D. The enlargement indicated generally at 6, and which is integral with the driven shaft C, has a ball bearing race 7 separating it from the inner end of the enlarged cylindrical portion B1 of the drive shaft B. The portion C1 of the driven shaft C that is rotatably received in the enlarged cylindrical portion B1 of the drive shaft, may be operatively connected to the drive shaft in a manner now to be described.

In Figure 18, I show the enlarged cylindrical portion B1 of the drive shaft B provided with four radially extending cylinders E, the axes of these cylinders lying in a plane which is at right angles to the longitudinal axis of the drive shaft B. The individual cylinders are spaced 90° from each other. Each cylinder E has its interior 8 communicating with the bore 5 of the enlarged cylindrical portion B1, by a passage 10. A cover 11 for each cylinder E has a central opening 12 for rotatably receiving a stem 13. The stem is integral with a rockable vane 14, see Figure 22, and this vane is free to rock within the cylinder interior 8.

It will also be seen from Figure 22 that the cylinder E has inwardly extending and diametrically opposed stationary vanes 15. The inner ends of the vanes 15 carry sealing strips 16 that contact with the outer surface of the stem 13 that projects into the interior 8 of the cylinder E. The two rockable vanes 14 are integral with the stem 13 and are diametrically opposed to each other as shown in Figure 22. The outer ends of the vanes 14 carry sealing strips 17 that contact with the inner surfaces of the cylinder E so as to provide a liquid tight seal. In Figures 22 and 23, it will be seen that the vane 14a has a passage 18 that leads from the right hand side of the vane in Figure 22 to the left hand side of the vane 14b, so as to place the compartment E1 in Figure 22 in communication with the compartment E2 for a purpose hereinafter described. A second passage 19, see Figure 23, extends from the left-hand side of the vane 14a to the right-hand side of the vane 14b so as to place the compartment E3 in communication with the compartment E4. The purpose of the dual passageways 18—19 will be explained hereinafter.

I wish to rock the rotatable vanes 14a and 14b in a particular manner in order to effect a variable connection between the drive shaft B and the driven shaft C. The variable connection is accomplished by means of a fluid which is fed into the compartments E1 to E4, inclusive, in a manner hereinafter described for forming a hydraulic connection between the drive and driven shafts B and C. Before describing the conveying means for the fluid to and from the compartments E to E4, inclusive, I will first describe how the vanes 14a and 14b may be swung in a predetermined manner between the stationary vanes 15.

Figure 18 shows the outer ends of the stems 13 in the horizontal cylinders E being connected by a gimbal ring F to two vertically arranged trunnions 20. In Figure 19, I illustrate one of the horizontal cylinders E in Figure 18 as facing directly forwardly and I show how the stem 13 is connected to a gimbal ring F. I further show how this gimbal ring F is connected to one of the two diametrically opposed vertical trunnions 20. The gimbal ring F is in reality formed of two halves indicated at F1 and F2 in Figure 18. These halves extend from a disc 21 that is keyed to the projecting end of the stem 13, see Figure 18 and extend to the bearing members 22 which in turn rotatably receive the vertical trunnion 20, see also Figure 17. The trunnion 20 is integral with an internal ring G, see Figure 19, that is rotatably mounted within a channel-shaped and rotatable thrust bearing H, see Figures 14 and 15. The internal ring G carries two trunnions 20 which are diametrically opposed to each other and the gimbal ring F connects the discs 21 on the horizontal cylinders E with these trunnions. The reference to vertical trunnions 20 and horizontal cylinders E is only for purpose of designation in the drawings as the parts are shown. Of course the cylinders E and the internal ring G, will be free to rotate about the longitudinal axis of the drive shaft B and therefore the cylinders and trunnions 20 will be constantly changing their positions.

Again referring to Figure 18, it will be seen that the vertical cylinders E have their exposed stems 13 keyed to discs 23. A second gimbal ring J is connected to the two discs 23 and is rotatably secured to two horizontal trunnions 24 that are disposed 90° away from the two vertical trunnions 20. The horizontal trunnions 24 are indicated in Figure 21 as being integral with a second internal ring K that is rotatably mounted within the channel-shaped thrust bearing H. Ball bearing races 25, 26 and 27 separate the internal gimbal-supporting rings G and K from each other and from the side walls of the channel-shaped groove in the thrust bearing H. The result is that the internal rings G and K are free to rotate within the channel-shaped thrust bearing. The channel-shaped thrust bearing H is of the shape shown in Figures 14 and 15. The two identical halves of this bearing are held together by cap screws 27a, see Figure 19. The thrust bearing H can rotate and it can be swung into angular positions, compare Figure 1 with Figure 30. The mechanism for accomplishing this will now be described.

In Figures 1 and 15, I show the channel-shaped thrust bearing H provided with horizontal trunnions 28 that are diametrically opposed to each other, and extend outwardly from the bearing. Gears 29 are keyed to the trunnions 28, see Figures 14 and 15, so that a rotation of the gears will rock the thrust bearing into the desired angular position. The two halves of the thrust bearing H have their outer edges in the shape of a rectangle, see Figures 14 and 15, while the rim of the annular groove that receives the rotatable rings G and K, forms the edge of a large opening within which are disposed the cylinders E.

In Figure 1, I show the side elevation of the thrust bearing H, and I further show one of the horizontal trunnions 28 and one of the gears 29. The trunnions 28 are rotatably received in bearings in the rotatable cage D. The purpose of the cage is not only to support the thrust bearing H with its trunnions 28 and its gear 29, but also to support a control mechanism for swinging the thrust plate H into the desired angular position.

Again referring to Figure 1, it will be seen that the gear 29 meshes with an upper worm sleeve 30 and also with a lower worm sleeve 31. There are two upper sleeves 30, see Figures 14 and 15, and their worm portions 30a mesh with the upper portions of the gears 29. In like manner there are two lower worm sleeves 31 and their worm portions 31a mesh with the lower portions of the same gears 29. The worm sleeve 30 is shown in section in Figure 1 and it will be seen that it is rotatably mounted in the front and middle members 32 and 33 of the cage D. The cage members 32 and 33 have recesses 32a and 33a for rotatably receiving the ends of the worm sleeves 30. In like manner, the worm sleeves 31 are rotatably mounted in the front and middle cage members 32 and 33.

Helical screw shafts 34 and 35 extend through the interiors of the worm sleeves 30 and 31, respectively, and project forwardly of the cage member 32. There are two helical screw shafts 34 and two helical screw shafts 35 and these have their forward ends rigidly secured to a sleeve 36, see Figures 1 and 10, so the shafts will be held against rotation about their own axes. The helical screw shafts can be moved in the direction of their longitudinal axes. The sleeve 36 is supported by and slides on the outer surface of the stationary sleeve 2 in which the drive shaft B rotates. A yoke 37 is connected to the sleeve 36 so as to move it along the stationary sleeve 2 while permitting the sleeve and the helical screw shafts to rotate with the cage D. The yoke 37 does not rotate, see Figure 30.

Before describing the mechanism for moving the yoke 37 on the stationary sleeve 2, it is best to set forth at this time that each of the helical screw shafts 34 and 35 is provided with a helical groove 38 of the type shown in Figures 1 and 15. The helical groove 38 has a short forward helical portion 38a and then this portion merges into a longitudinally-extending portion 38b followed by a second helical portion 38c. Pins 39, see Figures 1 and 14 are carried by the worm sleeves 30 and have their inner ends slidably received in the helical grooves 38. When the thrust bearing H is in neutral position, i. e., the vertical position shown in Figure 1, the pins 39 will be received in the longitudinal groove portion 38b. When it is desired to swing the thrust bearing H in a counter-clockwise direction about its trunnions 28, the yoke 37 is moved to the right by a means hereinafter described and this will move the helical screw shafts 34 and 35 longitudinally to cause the pins 39 of the worm sleeve 30 and 31 to move into the front helical portion 38a. Since the helical screw shafts 34 and 35 cannot rotate, the helical groove portions 38a will impart a rotative movement to the worm sleeves 30 to cause them to rotate and to rotate their worm portions 30a and 31a for rotating the gears 29 in a counter-clockwise direction when looking at Figure 1. When this movement takes place, the thrust bearing H will swing in a counter-clockwise direction and will be moved from its neutral position into a forwardly inclined position. The result of such movement will operatively connect the drive shaft B with the driven shaft C and this will be explained hereinafter.

It is best now to set forth the mechanism for moving the yoke 37 and rotatable sleeve 36 along the stationary sleeve 2 in the desired direction. Reference to Figures 10 and 11, shows the yoke 37 connected to two piston rods 40 and 40a and these rods are slidably received in closure members 41 for cylinders indicated generally at L and L1. Each piston rod 40 and 40a has an integral piston head 42 and 42a and the rod 40 is made hollow as at 43 for the greater portion of its length. A rotatable shaft 44 is rotatably received in an opening 45 that extends through the otherwise closed end of the cylinder L. The shaft 44 has helical grooves 46 therein and the piston head 42 has keys 47 extending inwardly into the bore 43 and being slidably received in the helical grooves 46. The result is that when the piston head 42 is moved within the cylinder L, the shaft 44 will be rotated. The cylinders L and L1 are disposed at opposite sides of the housing A, see Figures 1, 10 and 12, and an arcuate conduit 41a interconnects the interiors of the two cylinders. In Figure 3 a cross sectional view through the piston head 42 is made and clearly shows the inwardly extending keys 47 that ride in the helical grooves 46 of the shaft 44, see also Figure 13.

The means for moving the pistons 42 and 42a in the cylinders L and L1, will now be described. In Figure 1 the rotatable shaft 44 is shown provided with a bevel gear 48 and this gear meshes with another bevel gear 49 that forms a part of a control mechanism M shown in elevation in Figure 1 and set forth in enlarged sectional detail in Figures 26, 27 and 28. Figure 26 is a horizontal section through Figure 25 and a high pressure line 50 leads to both ends of a cylinder 51. Within the cylinder, I mount a reciprocable valve M1, see Figure 26, and this valve has a head at each end designated at 52 and 53. At the center of the elongated valve M1, I provide rack teeth 54 which are circular in shape and are larger in diameter than the reduced intermediate portion of the valve.

The rack teeth 54 mesh with gear teeth 55 formed on a ring 56 that is adapted to rotate about a vertical axis. Figure 27 shows the ring as being cup-shaped in vertical section and this ring has a tubular depending portion 57 in which a valve shutoff shaft 58 is keyed, see also Figure 28. The shaft 58 carries the bevel gear 49 at its lower end that is in mesh with the bevel gear 48. Again referring to Figure 27, it will be seen that the rotatable ring 56 carries inwardly extending bosses 59 that are disposed diametrically apart as clearly shown in both Figures 26 and 27, and these bosses rotatably carry idler bevel gears 60. The bevel gears 60 mesh with a bevel gear 61 that is mounted on the top of the shaft 58 to rotate therewith. The rotatable ring 56 is disposed within a housing 62 and a closure plate 63 covers the top of the housing and is provided with a vertical bore in which a valve control shaft 64 is rotatably mounted. Figure 27 shows the shaft 64 carrying a bevel gear 65 at its lower end and this gear meshes with both idler bevel gears 60. The function of this structure is to act as a differential connection between the valve control shaft 64 and the valve shutoff shaft 58.

The valve control shaft 64 is manually rotated by a shifting lever 66, see Figure 27. It is possible to swing the shifting lever 66 into any desired angular position and a projection 67 carried by the underside of the lever will ride over a plurality of radially extending teeth 68 formed on a disc 69, see Figures 28 and 29; also the schematic views in Figures 37 and 41. The disc is mounted on the top of the housing 62 and is secured to the closure plate 63 so as to be held against rotation. The swinging of the lever 66 will rotate the shaft 64. It is best to describe other parts of the mechanism before setting forth the operation of the manual control unit just described. In Figure 26 it will be seen that the ring 56 is limited in its rotative motion by inwardly extending diametrically opposed projections 70 that are integral with the housing 62 and these projections are received in recesses 71 that are provided in the periphery of the rotatable ring 56.

In Figure 26, I show a pipe 72 communicating with an annular groove 73 provided on the interior of the valve cylinder 51. A second pipe 74 is placed near the opposite end of the valve cylinder and this pipe communicates with an annular groove 75 disposed on the interior of the cylinder 51. The pipes 72 and 74 are shown in Figure 1 as extending from the valve cylinder 51 to opposite ends of the cylinder L. The pipe 74 communicates with the left-hand end of the cylinder and the pipe 72 communicates with the right hand end of the same cylinder. It will be seen that when the reciprocable valve M1 is shifted to the right in Figure 26, by the teeth 55 on the ring gear 62, the left-hand valve head 52 will uncover the annular groove 73 and permit fluid from the high pressure line 50 to pass into the pipe 72 and be transported to the right-hand end of the cylinder L for moving the piston 42 to the left in Figure 1. A pipe 45a places the right hand end of the cylinder L in communication with the right hand end of cylinder L1.

The fluid trapped on the left hand side of the pistons 42 and 42a during their movement to the left, will flow from the cylinder L1 through the pipe 41a and through the pipe 74 from the cylinder L, to enter the interior of the valve cylinder 51 between the valve head 53 and the teeth 54 because the valve head 53 has been moved to the right in Figure 26 and has uncovered the annular groove 75 to the interior of the cylinder 51. The valve head 53 prevents any communication between the uncovered annular groove 75 and a branch pipe 50a that communicates with the high pressure line 50. In Figure 26, I show the return or exhaust pipe 76 communicating with the interior of the housing 62. There is enough space between the rotatable ring 56 and the housing 62 to permit fluid flowing into the interior of the cylinder 51 to find its way between the rotatable ring 56 and the housing 62 and pass out through the exit pipe 76. In this way the flow of fluid to and from the cylinder L is controlled by the reciprocable valve M1 and the position of the valve in the cylinder 51 determines which way the pistons 42 and 42a will be moved in the cylinders L and L1. When the reciprocable valve M1 is in neutral position, the valve heads 52 and 53 will cover the annular grooves 73 and 75 and prevent any flow of fluid into or out of the valve cylinder. The parts are shown in neutral position in Figure 26.

It is now best to set forth how fluid is fed to the cylinders E so that the interior of the cylinders will be kept filled with fluid at all times. In Figure 1, I show an automatic relief valve indicated generally at N and Figure 4 shows the relief valve N in longitudinal section on a larger scale. The valve N comprises a housing 77 and this housing has a depending pipe 78 disposed at one end of the housing and extending down into a fluid reservoir P provided in the lower part of the casing A, see Figure 7. A check valve 79 is placed at the lower end of the pipe 78 and permits a flow of fluid in one direction only, and that is from the reservoir P up to the interior of the housing 17.

A second pipe 80 communicates with the interior of the housing 77 at the opposite end from the pipe 78 and this pipe has a check valve 81 placed at the entrance end. Figure 8 shows the check valve 81 on a larger scale. Both the pipes 78 and 80 are for the sole purpose of conveying liquid from the reservoir P into the valve housing 77 to make up fluid loss due to leakage. A central pipe 82 communicates with the center of the housing 77 and its purpose is to return fluid to the reservoir P from the interior of the cylinder 77 when the device is overloaded. Figure 4 shows the central pipe 82 communicating with an annular groove 83 that is provided on the interior of the cylinder 77.

A floating valve body or piston N1 is mounted within the cylinder 77 and may be moved to the right or left within the cylinder. The normal position of the valve body or piston N1 is illustrated in Figure 4 where it will close off the annular groove 83. Coil springs 84 and 85 bear against opposite ends of the valve body and their compression is adjusted to the desired point by adjustment screws 86 and 87. The adjustment is such as to hold the valve body or piston in the center of the cylinder 77 when the motors E and R need no fluid as clearly illustrated in Figure 4.

The fluid controlled by the relief valve N is placed in communication with the interior of the cylinder by pipes 88 and 89, see Figure 9, that communicate with the interior of the cylinder 77 and adjacent to the ends thereof. The pipe 88 communicates with the left-hand cylinder compartment N2, while the pipe 89 communicates with the right-hand cylinder compartment N3, see Figure 4. In Figures 1 and 30 I show the pipe 88 communicating with an annular groove 90 provided in a stationary sleeve Q, this sleeve enclosing a portion of the driven shaft C, see also Figure 6. The annular groove 90 provided on the interior of the sleeve Q communicates with a passage 91 provided in the driven shaft C. The other pipe 89 communicates with a second annular groove 92 provided in the interior of the stationary sleeve Q, see Figure 5. The annular groove 92 communicates with a second passage 93 provided in the driven shaft C. The passage 91 and 93 parallel each other and extend forwardly along the shaft C for a predetermined distance to crossover branch passages 91a and 93a, see Figure 30. The passages 91 and 93 then extend forwardly in parallel relation from the crossover passages 91a and 93a to a second set of crossover passages 91b and 93b. The branch passages 91b and 93b are associated with the cylinders E, already described, and form part of the fluid transmission between the drive shaft B and the driven shaft C. The branch passages 91a and 93a are associated with a second fluid transmision between the driven shaft C and the fixed sleeve Q. Between the passages 91b and 93b in Fig. 18 valve-like projections 93c are formed in the shaft C and close and open passages 10.

In Figure 30A, I show in a schematic way, the path taken by the fluid from the fluid reservoir P, through the inlet pipe 78 of the relief valve N, the pipe 88 to the passage 91, the crossover branch 91a, the continuation of the passage 91, and thence to the crossover branch 91b to the front group of cylinders E. The fluid returns back through the crossover branch 93b, passage 93, to the crossover branch 93a, the continuation of the passage 93, and then to the relief valve N, by means of the pipe 89. The fluid entering the relief valve casing 77 will move the valve body N1 and cause the fluid to return to the reservoir P by way of the pipe 82. The movement of the vanes 14 in the cylinders E will cause the fluid to flow in a particular manner to a second group of cylinders R as hereinafter set forth. The relief valve N merely keeps the passages and compartments filled with fluid and relieves any excess fluid.

The crossover branches 91a and 93a have ports at their ends communicating with a second group of cylinders R and vanes of the same construction as the cylinders E and the vanes 14. This second group of cylinders and associate parts will be briefly described before the operation of the device is set forth. In Figures 1 and 30 a second channel-shaped thrust bearing H1 is shown placed between the middle member 33 of the cage D and a rear member 100 of the same cage. The middle member 33 of the cage is integral with the driven shaft C, see Figures 1 and 30. The front cage member 32 rotates on ball races 101 and 102 that are placed between the member and the end of the sleeve 2, and between the member 32 and the drive shaft B. The rear cage member 100 rotates on the stationary sleeve Q, see Figure 30, and a ball bearing race 103 supports the rear member in an antifriction manner.

The second channel-shaped thrust bearing H1 is shown in both Figures 1 and 30 as being tilted so as to be inclined toward the right. The thrust bearing H1 can be swung about horizontal trunnions 28a to the right or to the left from neutral position, in the same manner as the thrust bearing H, with its trunnions 28a are rotatably carried by the rotatable cage D and may be swung to the right or left from neutral position. The trunnions 28a for the thrust bearing H1, have gears 29a, see Figure 1, that are keyed thereto and these gears are in mesh with two worm sleeves 104 and two worm sleeves 105, that are similar to the worm sleeves 30 and 31. The worm sleeves 104 and 105 have worm portions 104a and 105a that mesh with the two gears 29a, and the worm sleeves are rotatably carried by the middle and rear cage members 33 and 100.

The helical screw shafts 34 and 35, shown in Figure 1, not only extend through the pairs of worm sleeves 30 and 31, but they also extend through the additional pairs of worm sleeves 104 and 105. The helical grooves 38 in the two shafts 34 and in the two shafts 35, have longitudinally extending portions 38d that extend from the rear end of the second helical portion 38c, on to a third helical portion 38e that is received within the worm sleeves 104 and 105. The third helical portion 38e merges into a short longitudinal portion 38f and terminates in a fourth helical portion 38g. Pins 39a, see Figures 1 and 2, are carried by the worm sleeves 104 and 105, and are received in the longitudinal portions 38d of the grooves 38.

The helical groove portion 38a stands for Reverse; the straight portion 38b stands for Neutral; while the helical portion 38c stands for Half Speed forward. So long as the pins 39 are in the groove portions 38a, 38b and 38c, the pins 39a will remain in the straight grooves 38d. The helical groove portion 38e stands for 1:1 ratio between the drive shaft B and the driven shaft C and the helical groove portion 38f stands for Overdrive. When the pins 39a are in the helical groove portions 38e and 38g, the pins 39 will be received in the straight groove portions 38d. The parts are shown in Neutral position in Figures 1 and 38, while in Figures 30 and 39, the parts are shown in half speed forward position, although there is always a hydraulic connection between the drive shaft B and the driven shaft C. When the pins 39a are in the position shown in Figure 1, the thrust bearing H1 will be inclined to the right in this figure, which is the equivalent to a full stroke being effected by the vanes 106, see Figure 30, in the second group of cylinders R for each revolution of the drive shaft B. However, the device will be neutral because the thrust plate H will be neutral. The pistons 42 and 42a will be positioned one-sixth the distance from the right hand ends of the cylinders L and L1, see Figure 38.

Returning to the second thrust bearing H1 and its associate parts, there are four radially extending cylinders R for the stationary sleeve Q just as there are the four cylinders E for the rotatable drive portion B1, see Figure 30 where two of the cylinders are illustrated for each bank of cylinders E and R. Each cylinder R has a stem 13a that is axially aligned with the cylinder and carries the radially extending vanes 106, see Figure 30A. Stationary vanes 107, and shown in section in Figure 30, extend inwardly from the inner wall of the cylinders R and bear against the rockable stems 13a in the same way as the vanes 15 shown in Figures 22-24, inclusive, bear against the rockable stems 13.

The first thrust bearing H is shown in vertical or neutral position in Figure 1, and this is when the pins 39 are received in the longitudinal portions 38b of the grooves 38. If the helical screw shafts 34 and 35 are moved to the right in Figure 1, as far as possible, the thrust bearing H will be rotated clockwise about the trunnions 28 into a position somewhat similar to the right-hand thrust bearing H1, except the thrust plate H will be in one-half stroke position, see Figure 37. The pistons 42 and 42a will be at the extreme right ends of the cylinders L and L1. The right-hand thrust bearing H1 will remain in the position shown in Figure 1 during this movement because the pins 39a will merely slide along the longitudinal groove portions 38d. When the thrust bearing H is inclined to the right, the drive shaft B when making one revolution will cause the driven shaft C to rotate in a reverse direction.

Figure 30A illustrates the fluid flow through the various parts when the device is placed in Reverse position as schematically indicated in Figure 37. The drive shaft B, not shown in Figure 30A, will rotate counter-clockwise when looking from the left-hand end of Figure 30A, and the drive shaft C will be rotated in a clockwise direction. The revolvable cage D will also rotate in a clockwise direction. The thrust of the gimbal ring J against the thrust bearing H will give a counter-clockwise thrust to the bearing.

The high pressure of the fluid in the compartment E1 produced by the vane 14a swinging to the right, will cause a high pressure working flow of fluid to move through the passage 91 toward the group of cylinders R. A high pressure working flow of fluid is established in the compartment R3 in one of the cylinders R to swing the vane 106a to the right. The high pressure area will also establish itself in the passage 91 that connects with the pipe 88, but in this passage there will be a high pressure vibrating flow as indicated by the arrows pointing in both directions for the passages 91 and 88.

There will be no fluid flow through the pipe 82. A low pressure vibrating flow of fluid will take place in communicating passages 89 and 93 and this is indicated in Figure 30A by the arrows pointing in both directions for these passages. The thrust of the gimbal ring J associated with the cylinders R will give a clockwise thrust to the thrust bearing H1. A full stroke will be imparted to the thrust bearing H1 while only a half stroke is imparted to the thrust bearing H. The full stroke of the thrust bearing H1 therefore overcomes the half stroke of the thrust bearing H and the cage D will therefore be rotated in a clockwise direction.

A low pressure idle flow of fluid will move along the passage 93 from the cylinders R to the cylinders E as indicated by the arrows in Figure 30A. The driven shaft C will be rotated in an opposite direction to the drive shaft B and the device is therefore in Reverse position.

Neutral position is illustrated in Figures 1 and 38. The drive shaft B will rotate counterclockwise and there will be no rotation of the driven shaft C. There will be no flow of fluid through the passages 91 and 93 because the plane of the thrust plate H will be perpendicular to the axes of the drive and driven shafts. The only time fluid will be discharged from the pipe 82 is when the device is overloaded. Figures 37 and 38 illustrate the position of the lever 66 for Reverse and Neutral positions.

A movement of the helical screw shafts 34 and 35 to the left from the position shown in Figure 1, will move the device into forward Half Speed. The pins 39 will ride from the longitudinal groove portions 38b into the helical portions 38c and the thrust bearing H will be swung into the inclined position shown in Figure 30. The right-hand thrust plate H1 will still remain in its inclined position as illustrated in both Figures 1 and 30. The pistons 42 and 42a will be moved to the centers of the cylinders L and L1 to effect this movement. The thrust bearings H and H1 will be inclined in opposite directions and therefore the input shaft B will rotate twice as fast as the driven or output shaft C, see Figure 39.

For the Half Speed forward position of Figure 39, the drive shaft B will rotate counterclockwise. The thrust plate H and H1 will each have a full stroke. The high pressure working flow will be in the portion of passage 93 that connects the fluid pressure in compartment E4 with the fluid pressure in compartment R2. The actual fluid in this passage will be from the cylinders E to the cylinders R or just opposite from that indicated in Figure 30A.

The idle low pressure fluid flow will be in that portion of the passage 91 that extends from the compartment R3 to the compartment E1, and the direction of flow will be opposite from that illustrated in Figure 30A. The portions of the passages 91 and 93 that connect with the pipes 88 and 89, respectively, will have the vibrating flow in both directions. There will be no fluid flow in pipes 80 and 82 and only sufficient flow in pipe 78 to make up any deficiency.

The thrust on the gimbal J will give a counterclockwise thrust on the plate H. The thrust of the other gimbal associated with the plate H1, will give a counterclockwise thrust to this plate. Thus there are two equal counterclockwise thrusts on the cage D and this will cause the driven shaft C to rotate counterclockwise at one-half the speed of the drive shaft B. Fluid is drawn from the cylinder E to supply the cylinders R. Figure 39 illustrates the position of the lever 66 for Half Speed forward position.

A still further movement of the helical screw shafts 34 and 35 to the left beyond the positions shown in Figure 30, will move the pins 39 into the longitudinal groove portions 38d, and will move the pins 39a into the third helical portions 38e. The right-hand thrust bearing H1 will be swung into neutral position and the left-hand thrust bearing H will remain in the inclined position to the left as illustrated. The pistons 42 and 42a will have been moved to one-sixth the length of the cylinders L and L1 from the left-hand end. The parts will be in Direct Drive position. For each turn of the drive shaft B, the driven shaft C will make one turn, see Figure 40.

For the Direct Drive or the 1:1 ratio position, the rotation of the drive shaft B will be in a counterclockwise direction. The thrust of the gimbal J will give a counter-clockwise thrust against the plate H. No fluid will be drawn off by the cylinders R from the cylinders E because the thrust plate H1 will be in neutral position. There will therefore be no fluid flow of either high pressure in passage 93 or low pressure in the passage 91, and also no fluid flow in the pipes 88 and 89. The cage D and the driven shaft C will be driven at the same speed and in the same direction as the drive shaft B. The lever 66 will be at the position shown in Figure 40, for the 1:1 ratio.

A complete movement of the pistons 42 and 42a to the left-hand ends of the cylinders L and L1 will cause the pins 39 to travel further along the longitudinal grooves 38d as the helical screw shafts 34 and 35 are moved to the left in Figure 1. The same movement will cause the pins 39a to travel from the longitudinal groove portions 38f into the fourth helical groove portion 38g and to swing the right-hand thrust bearing H1 from neutral position into one where it will be inclined to the left. Therefore, both the thrust bearings H and H1 will be inclined to the left and the device will be in Overdrive forward position. One revolution of the drive shaft will rotate the driven shaft through two revolutions or there will be an overdrive, see Figure 41.

It will therefore be seen as the pistons 42 and 42a are moved from the right-hand ends of the cylinders L and L1 to the left-hand ends; the transmission will move from reverse to neutral for the first one-sixth length of the cylinders; then to one-half speed when the pistons reach the midway point; then to a one to one ratio between the drive and driven shafts when the pistons are one-sixth the distance from the left-hand ends of the cylinders; and finally to overdrive when the pistons reach the extreme left-hand ends of the cylinders. The changing of the speeds from reverse, through neutral to overdrive is continuous and gradual as the lever is swung over the dial 68 to effect the desired speed change, see Figures 37 to 41 for the lever 66 settings.

The flow of the fluid through the passages 91 and 93, when the parts are in Overdrive position, will be the same as indicated by the arrows in Figure 30A, excepting that the high pressure working flow and the low pressure idle flow, will be reversed. The high pressure working flow will be in that portion of the passage 93 that extends between the groups of cylinders R and E. The high pressure will be equal in the compartments R2 and E4. There will also be a high pressure back and forth or vibration flow of fluid in that portion of the passage 93 that extends from the cylinders R to the pipe 89.

The low pressure idle flow will be in that portion of the passage 91 that extends between the groups of cylinders E and R. The low pressure vibrating flow will be in that portion of the passage 91 that extends from the cylinders R to the pipe 88.

The thrust of the gimbal J will give a counterclockwise thrust to the thrust plate H, and since this is a full stroke, it will overcome the half stroke thrust of the gimbal against the thrust plate HI in a clockwise direction. The cage D will therefore be rotated counterclockwise and fluid will be drawn off from the cylinders R and added to the cylinders E, thereby causing a secondary counterclockwise thrust to be applied to the thrust plate H. The cage D and the driven shaft C will therefore rotate at a faster speed than the drive shaft B. In fact the driven shaft C will rotate at twice the speed of the drive shaft B and in the same direction. Figure 41 indicates the position of the lever 66 when the parts are in Overdrive.

From the foregoing description of the various parts of the device, the operation thereof may be readily understood.

In setting forth the operation of the device, it is best to refer to the schematic Figures 37 and 41, inclusive. Figure 37 illustrates that the lever 66 can be swung from the Reverse position shown, through three-fourths of a circle around the dial 69 and back again, as indicated by the dot dash arrow lines 108 in this figure. The lever 66 assumes the position shown in Figure 38, when the device is in Neutral. Figure 39 shows the lever 66 swung still further in a counterclockwise position to indicate Half Speed forward. Again, in Figure 40, the lever 66 has been swung farther around in a counter-clockwise direction to bring the parts into 1:1 ratio. Finally, in Figure 41, the lever 66 has completed its counter-clockwise swing and the parts are now in Overdrive position.

It is possible to swing the lever 66 into any intermediate position between its extremes of travel. In this way the device can provide any desired speed ratio between the Reverse position shown in Figure 37 and the Overdrive position illustrated in Figure 41. Applicant has already set forth how the swinging of the lever 66 will act on the fluid control mechanism M, see Figures 25 to 28, inclusive, so that the pistons 42 and 42a will be moved into the various positions indicated in Figures 37 to 41, inclusive, for causing the device to operate in any of the forward or reverse speeds or to remain in Neutral. The moving of the pistons 42 and 42a will act upon the cross head 37, see Figures 1 and 30, and move the helical screws 34 and 35, and rotate the worm sleeves 30, 31 and 104, 105. The worm sleeves when rotated will swing the thrust plates H and HI in the manner schematically shown in Figures 37 to 41, inclusive, and in this way the driven shaft C will rotate at different speed ratios and in either direction with respect to the drive shaft B.

A more detailed description of the fluid flow in the cylinders or motors E and R and the passages 91 and 93 for the Reverse Speed position, will be helpful. In Figure 30A, the entire flow is illustrated. It should be noted that the driven shaft C has two rows of rotating projections for each of the motors E and R, and these projections act as valves for the passages 10. The valve vanes 93c are shown in Figure 18, and Figures 31 to 36, inclusive, illustrate how these valve vanes rotate with the shaft C so as to cover and uncover the passages 10 in proper sequence.

The high pressure fluid working flow, moves from the compartment E1 in one of the cylinders in the motor E, along the passage 91 to the compartment R3 in one of the cylinders in the motor R. The fluid pressures will be equal in the compartments E1 and R3 and the movement of the vane 14a to force the fluid from the compartment E1, will cause the high pressure fluid flow just mentioned. The fluid entering the compartment R3 will act on the vane 106a to swing it. The fluid temporarily forced from the compartment R1 will enter the low pressure passage 93 and pipe 89, ready to return to the compartment R1 as soon as the vane 106a reverses its swing. A vibrating fluid flow will therefore be established in that portion of the passage 93 that connects the compartment R1 with the pipe 89.

A low pressure idle fluid flow will be established in the portion of the passage 93 that connects the compartment R2 with the passage E4. The flow will be in the direction of the arrow. This flow will merely continue to fill the compartment E4 with fluid as the vane 14b swings to increase the size of this compartment and decrease the size of compartment E2. The fluid in compartment E2 will be under high pressure and will be forced from this compartment into the high pressure portion of the passage 91 that leads to the compartment R3. It will also be seen that the low pressure portion of passage 93 will feed fluid to the compartment E3 to keep this compartment filled with fluid as the vane 14a swings to enlarge this compartment and to reduce the capacity of the compartment E1.

Figures 30 and 30A distinctly illustrate the diagonal or crossover passages 91b in the driven shaft C that place the compartments E3 and E4 in communication with each other and that place the compartments E1 and E2 in communication with each other. One pair of vane valves 93c control the passages 10 in the fixed vanes 15 that form a wall of the compartments E1 and E4, and the other pair of vane valves 93c control the other passages 10 in the other fixed vanes 15 that form a wall of the compartments E2 and E3. The vane valves 93c in each pair are 180° apart as clearly shown in Figure 18.

At any one moment during the Reverse speed operation, the compartments E1 and E2 have high pressure fluid therein due to the vanes 14a and 14b reducing these compartments and this fluid is directed through the passage 91 into the compartments R3 and R4 for swinging the vanes 106a and 106b and imparting rotation through the thrust plate HI, to the driven shaft C. At the end of each stroke of the vanes 14a, 14b and 106a and 106b, they will be swung in the opposite direction. The compartments E3 and E4 will then become high pressure fluid compartments and the compartments R1 and R2 will likewise receive this high pressure fluid from the passage 93 and the crossover passages 93a and 93b.

Figure 35:
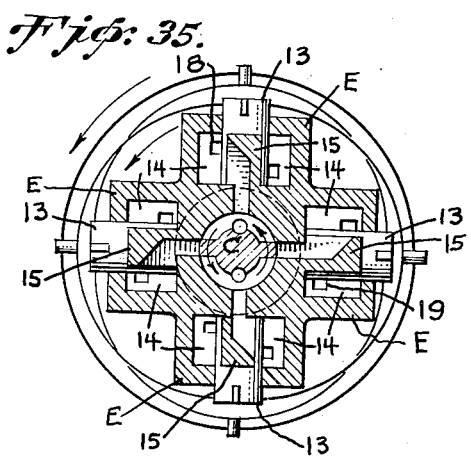
Figure 36:
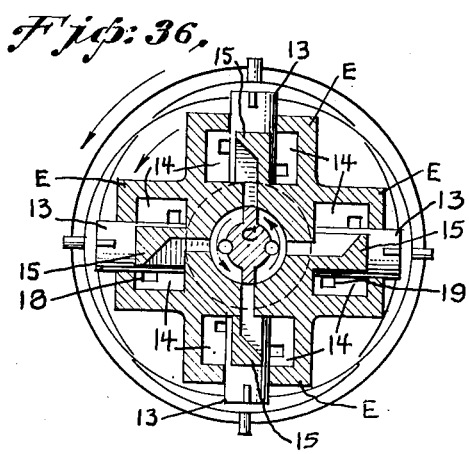

Figures 35 and 36 indicate the flow of fluid in the rotating motor E when the parts are arranged for a 1:1 ratio between the drive shaft B and the driven shaft C. The thrust plate HI of the non-rotating motor R will be in neutral position, see Figure 40, and therefore the vanes 106 in these cylinders will not swing. The anchored motor R will therefore draw no fluid into its cylinders and the rotating motor E will be free to impart direct rotation to the driven shaft C from the drive shaft B. This results in a Direct Drive or a 1:1 ratio.

In the Reverse position of Figure 37, the rotating motor E has its vanes 14 making a half stroke while the non-rotating motor R has its vanes 106 making a full stroke. The motor E will tend to rotate the driven shaft C counter-clockwise while the motor R will tend to rotate the driven shaft C, clockwise. Since the non-rotating motor R is imparting a full stroke to its vanes 106 and the rotating motor E is imparting only a half stroke to its vanes 14, the vanes 106 will have the greater leverage and resultant force will rotate the driven shaft C in a clockwise direction and therefore the parts will be in Reverse speed.

The control mechanism M for the pistons 42 and 42a is such that when the pistons have been moved in the cylinders L and L1 to the position corresponding to the position of the lever 66 on the dial 68, the shaft 44 will actuate the gears in the control mechanism M for returning the valve M1 to a position to close the pipes 72 and 74. The pistons 42 and 42a will then cease to move and the hydraulic transmission will operate at the set speed. It is possible to have the hydraulic transmission operate at any speed between its extremes of Reverse as shown in Figure 37 and Overdrive as shown in Figure 41.

Figures 31 to 34, inclusive, illustrate diagrammatically the position of the various parts of the cylinders E when the device is in intermediate position or Half Speed forward position. The low pressure fluid from the motor R will be along the passage 91 to the motor E. The passage 10 to the top cylinder E in Figure 31 is uncovered by the vane valve 93c and therefore the fluid will flow into the compartment E1 as the vane 14a swings to the left in Figure 30A. The flow is opposite to that shown as Reverse position in Figure 30A.

The fluid in compartment E3 will be under high pressure because the swinging vane 14a will be continuously reducing the size of this compartment. The high pressure fluid forced out from the compartment E3 will flow along the diagonal passage 93b to the high pressure passage 93. At the same time the swinging vane 14b in the lower cylinder E will be continuously reducing the capacity of the compartment E4 and forcing the fluid therein, into the passage 93. The other diagonal passage 91b, connects with the low pressure passage 91 and fills the compartment E2 with fluid as this compartment expands.

The two horizontally arranged cylinders E in Figure 31 will have their passages 10 closed by the vane valves 93c and there will be no flow of fluid into or out of the compartments in these cylinders. The high pressure fluid will flow along the passage 93 to the vertical cylinders R and will act upon the vanes 106a and 106b to enlarge the compartments R1 and R2, see Figure 30A (keeping in mind that the fluid flow is opposite from that shown in Figure 30A, because the figure illustrates Reverse position). The vanes 106a and 106b decrease the size of the compartments R3 and R4 and the fluid forced out from the compartment R4 will enter the crossover branch 91a to the passage 91 while the fluid from the compartment R3 will flow directly into the passage 91 for entering the compartments E1 and E2.

Figure 32:
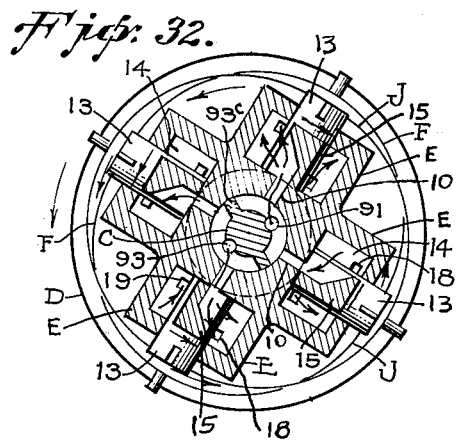
Figure 33:
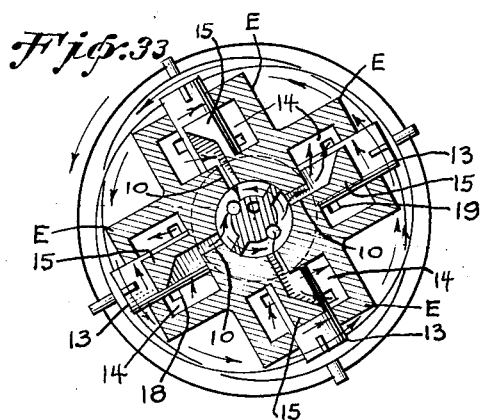
Figure 34:
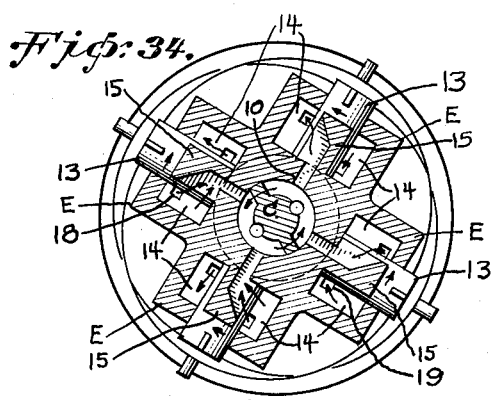

When the cylinders E have rotated 60° to the position shown in Figure 32, all four passages 10 leading to all four cylinders E will be temporarily uncovered and the fluid flow will be as shown by the arrows. Further rotation of the cylinders E through another 60° is illustrated in Figure 33. Here again all four passages 10 are open and the fluid flow is as indicated by the arrows. Figure 34 shows the cylinders rotated through another 60° and the arrows again indicate the fluid flow.

I claim:
1. A hydraulic transmission comprising: a drive shaft having a first bank of four radially extending cylinders, each lying in a plane disposed at right angles to the shaft axis and being spaced 90° apart from each other; a centrally disposed shaft mounted in each cylinder and being swingable about an axis coinciding with the longitudinal axis of the cylinder; a pair of outwardly extending and diametrically opposed vanes mounted on each cylinder shaft and slidably contacting with the interior surface of the cylinder; a pair of diametrically opposed fixed vanes extending inwardly from the inner surface of each cylinder wall and slidably contacting with the cylinder shaft to form four compartments for each cylinder; a thrust plate swingable about an axis in the plane of the four cylinders; gimbal mounting connections between the thrust plate and the cylinder shafts for causing the latter to swing their vanes in a predetermined manner according to the angular position of the thrust plate; a driven shaft having fluid conveying passages adapted to communicate with the four compartments in each cylinder; means for supplying fluid to the passages; valve-like members on the shaft for controlling the fluid flow between the passages and the cylinder compartments; a cage connected to and rotatable with the driven shaft; a second bank of four radially extending stationary cylinders, each lying in a plane disposed at right angles to the driven shaft axis and being spaced 90° apart; said second bank of cylinders having centrally disposed shafts; vanes on the cylinder shafts in the second bank of cylinders; stationary vanes on the cylinder walls on the second bank of cylinders; a second thrust plate swingable about an axis that lies in the plane of the second bank of cylinders; a second gimbal mounting connection between the second thrust plate and the second set of cylinder shafts for causing the latter to swing their vanes in a predetermined manner according to the angular position of the second thrust plate; the fluid conveying passages of the driven shaft also communicating with the compartments in the second set of cylinders; additional valve-like members on the shaft for controlling the fluid flow between the passages and the compartments in the second set of cylinders; and means carried by the cage and operatively connected to the thrust plates for swinging them into different angular positions for altering the speed of rotation of the driven shaft with respect to the drive shaft.

2. The combination as set forth in claim 1; and in which manually controlled speed setting means is operatively connected to the thrust plate swinging means for holding the thrust plates at the angle determined by the setting of the manually controlled speed setting means.

3. A hydraulic transmission comprising: a drive shaft having a first bank of four radially extending cylinders, each lying in a plane disposed at right angles to the shaft axis and being spaced 90° apart from each other; an oscillatable shaft mounted in each cylinder and being swingable about an axis coinciding with the longitudinal axis of the cylinder; a pair of outwardly extending and diametrically opposed vanes mounted on each cylinder shaft and slidably contacting with the interior surface of the cylinder; a pair of diametrically opposed fixed vanes extending inwardly from the inner surface of each cylinder wall and slidably contacting with the cylinder shaft to form four compartments for each cylinder; a thrust plate swingable about an axis that lies in the plane of the four cylinders; gimbal mounting connections between the thrust plate and the cylinder shafts for causing the latter to swing their vanes in a predetermined manner according to the angular position of the thrust plate; a driven shaft having fluid conveying passages adapted to communicate with the four compartments in each cylinder; means for supplying fluid to the passages and relieving the passages of excess fluid; valve-like members on the shaft for controlling the fluid flow between the passages and the cylinder compartments; a stationary sleeve enclosing a portion of the driven shaft and having a second bank of four radially extending stationary cylinders, each lying in a second plane disposed at right angles to the driven shaft axis and being spaced 90° apart; each cylinder in the second bank of cylinders being provided with an oscillatable shaft, diametrically opposed vanes on the shaft, and inwardly extending stationary vanes that lie between the inner cylindrical surface and oscillatory shaft, in the same manner as with the first bank of cylinders; a second thrust plate swingable about an axis that lies in the second plane; a second gimbal mounting connection between the second thrust plate and the second set of cylinder shafts for causing the latter to swing their vanes in a predetermined manner according to the angular position of the second thrust plate; the fluid conveying passages of the driven shaft also communicating with the compartments in the second set of cylinders; additional valve-like members on the shaft for controlling the fluid flow between the passages and the compartments in the second set of cylinders; a cage rotatable with the driven shaft; means carried by the cage and operably connected to the thrust plates for swinging them into different predetermined angular positions for altering the speed of rotation between the drive and driven shafts and the direction of rotation between the two shafts.

4. The combination as set forth in claim 3; and in which manually controlled speed setting means is operatively connected to the thrust plate swinging means for holding the thrust plates at the angle determined by the setting of the manually controlled speed setting means.

No references cited.